United States Patent [19]
Yagawa

[11] Patent Number: 5,269,206
[45] Date of Patent: Dec. 14, 1993

[54] CABLE STRIPPING APPARATUS

[75] Inventor: Hiroshi Yagawa, Tokyo, Japan

[73] Assignee: AMP Incorporated, Harrisburg, Pa.

[21] Appl. No.: 985,246

[22] Filed: Dec. 2, 1992

Related U.S. Application Data

[63] Continuation of Ser. No. 835,791, Feb. 14, 1992, abandoned.

Foreign Application Priority Data

[30] Feb. 28, 1991 [JP] Japan .................. 3-034550

[51] Int. Cl.$^5$ .................................... H02G 1/12
[52] U.S. Cl. ...................................... 81/9.51
[58] Field of Search .............. 81/9.4, 9.41, 9.42, 81/9.43, 9.51

[56] References Cited

U.S. PATENT DOCUMENTS

| | | | |
|---|---|---|---|
| 3,139,778 | 7/1964 | Bielinski et al. | 81/9.51 |
| 3,363,309 | 1/1968 | Logan et al. | 81/9.51 X |
| 3,564,951 | 2/1971 | Metcalf | 81/9.42 |
| 3,951,016 | 4/1976 | Gudmestad et al. | 81/9.51 |
| 4,815,207 | 3/1989 | Schwartzman | 81/9.51 X |
| 4,920,830 | 5/1990 | Stepan | 81/9.42 X |
| 5,025,687 | 6/1991 | Butler | 81/9.51 |
| 5,033,335 | 7/1991 | Yatsu et al. | 81/9.51 X |

*Primary Examiner*—D. S. Meislin
*Attorney, Agent, or Firm*—Adrian J. LaRue; Timothy J. Aberle

[57] ABSTRACT

An apparatus (11) for stripping cable (12) to remove a section of cable jacket (13) includes opposed stripping blades (15) each having a pair of adjacent blade sections (18) including semi-circular cutting edges (19) defined by grooves (20) operable to cut the jacket (13) peripherally with the adjacent blade sections (18) driven axially apart in a relative sense to pull the cut section of the jacket away from the cable. Pairs of guide and gripping members (16) having internesting teeth (23, 24) are positioned adjacent the blade sections (18) to grip the cable (12) and provide a support for the cable. A suction device (17) is displaced axially to receive the cut jacket section and remove such from the stripping site.

8 Claims, 6 Drawing Sheets

5,269,206

CABLE STRIPPING APPARATUS

This application is a Continuation of application Ser. No. 07/835,791 filed Feb. 14, 1992, now abandoned.

This invention relates to an apparatus and method for stripping electrical or optical cable to remove a section of cable jacket from an inner core thereof.

BACKGROUND OF THE INVENTION

Many terminations of both electrical and optical cables require that the cable be stripped with a section of cable jacket removed from the inner cable core. In all cases, the object of the stripping operation is to remove a section of jacket precisely and cleanly without damaging the inner core in any way. This objective is frequently not met because in order to remove the section of cable jacket during stripping, the cable must be tightly gripped to deform and mark the cable jacket adjacent to the stripped section. Additionally, the pulling of the jacket to remove the stripped section may place tensional loads on both the jacket and the cable core to result in damage to these cable components. Another problem lies with the blades used to strip cable which may nick the cable core, resulting in poor transmission of optical energy in the case of glass or plastic fiber optic cables or in weakened strands in the case of copper electrical conductors.

Accordingly, it is an object of the present invention to provide an improved stripping apparatus which minimizes damage to a cable, its jacket and core during stripping operations. It is a further object to provide a stripping apparatus for cable that facilitates a precise, clean, and non-damaging removal of a section of cable jacket from a cable core. It is still a further object to provide a stripping apparatus which facilitates the necessary gripping and support of a cable with minimum damage to the cable jacket or core during stripping operations. It is a final object to provide a stripping apparatus capable of stripping multiple cables and removing the jacket section automatically.

SUMMARY OF THE INVENTION

The present invention includes an apparatus which features blade members, upper and lower, driven to close against a cable to be stripped. The blade members are surrounded by adjacent guide and gripping members which move with the blade members in radial closure relative to the cable. The guide and gripping members include internesting teeth to grip and support the cable on either side of the blade members. The blade members include blade sections that are grooved to define semi-circular blade edges dimensioned to bite into the cable jacket but without touching the cable core. The blade members include upper an lower pairs of blade sections oppositely oriented with respect to the beveled sharp edges to define wedge shapes which effectively cut through all but a small portion of the cable jacket in closure. Thereafter, the blade sections, upper and lower, along with guide and gripping members, upper and lower, are pulled relatively apart in an axial sense to remove the cut jacket section. Because of the support of the guide and gripping members in an axial sense and the surfaces of internesting teeth of the guide members, minimum tensional stresses are placed upon the cable jacket material and the cable core during the axial displacement which removes the cut cable section. A suction element is provided, axially aligned with the cable to receive the cut jacket section and remove such section from the stripping operation and apparatus. Following the foregoing cycle of actions, the stripping apparatus is operated to return the blade members and guide and gripping members to the initial open position preparatory for the next stripping operation. The blade members and guide and gripping members are, in a preferred embodiment, provided with multiple cable stripping portions.

IN THE DRAWINGS

DETAILED DESCRIPTION OF THE INVENTION

Figure 12:
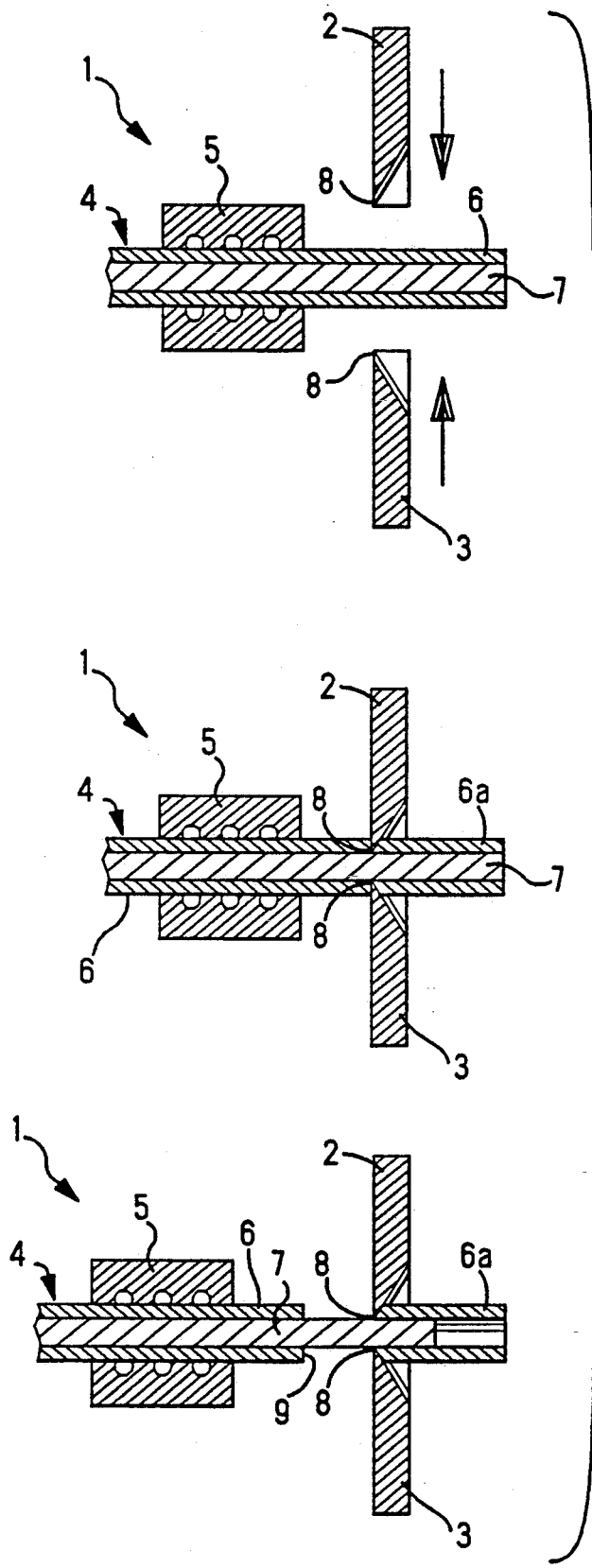
FIG. 12 is a side, sectioned view of the prior art depicting an apparatus in three positions relative to a cable, open, closed, and axially displaced.
Figure 13:
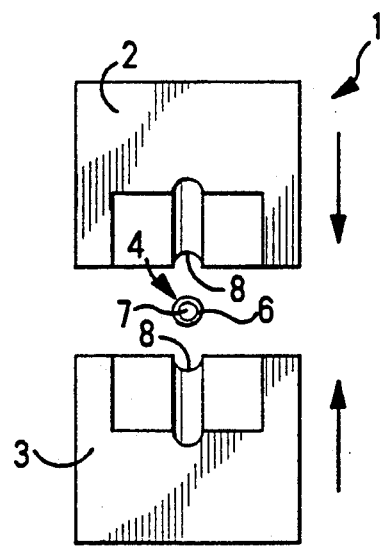
FIG. 13 is a front, elevational view of the stripping blades shown in FIG. 9 in an open position relative to a cable.

Referring first to FIGS. 12 and 13, a typical form of cable stripping apparatus 1 is shown to include upper and lower stripping blades 2 and 3 positioned relative to a cable 4, gripped by a gripping member 5, and including an insulating jacket 6 and an inner core 7. The blades 2 and 3 have cutting edges 8 formed through the beveling of the blades in a manner to define a semi-circular configuration as shown in FIG. 13. In the upper view of FIG. 12, the blades 2 and 3 are open with the adjacent view showing the blades closed radially against the cable with the edges cutting through the jacket 6. Thereafter, the blades are moved axially along the cable as shown in the middle view thereby pulling the cut section 6A of jacket 6, along the core 7 to remove the jacket section from the cable and effectuate the stripping action. As earlier mentioned, one of the problems in cable stripping is the tensile load placed upon the cable, jacket, and core caused by the axial pulling shown in the bottom view of FIG. 12. If the cutting edges 8 are shaped and driven to close precisely against the core and thus sever the jacket completely, it becomes likely that the edges will nick or cut or scrape the core 7 to result in unwanted damage leading to either a loss in transmission characteristics relative to optical cable or as a source for fracture in bending of the cable in use. If the edges 8, as is typically the case, are not positioned to cut through all of the jacket, the axial displacement will result in a tearing of the jacket necessary to remove the cut section 6A. This tearing can excessively stress not only the jacket to change its dielectric characteristics, but also the core to change its transmission and related characteristics. It is typical to provide broad based grippers like 5 which clamp firmly against the cable jacket to hold the cable and prevent slippage during the axial displacement for removal of the cut section. This gripping can result in deformation of the cable so that it is physically marked, alteration of the transmission characteristics of the core and of the dielectric qualities of the jacket. These, then, are the problems encountered in stripping cable, and FIGS. 12 and 13 are typical structures used in a typical way to effectuate stripping of cable.

Figure 1:
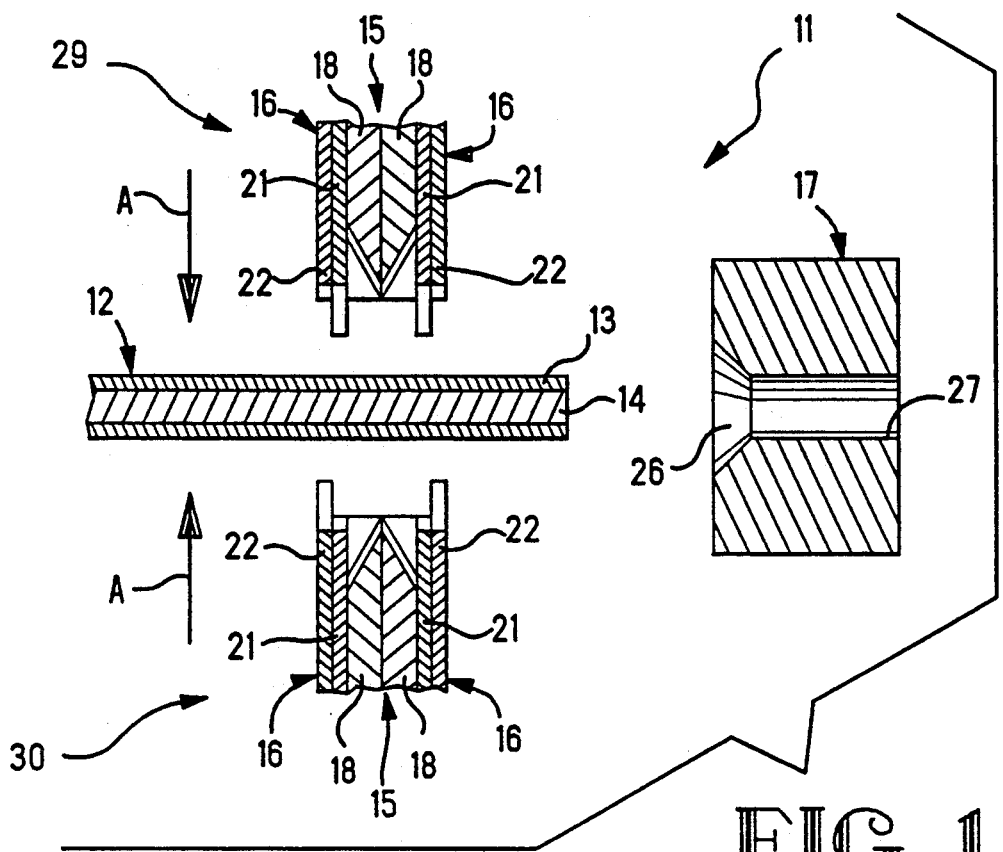
FIG. 1 is a side, sectioned view of the apparatus of the invention in an open position relative to a cable prior to stripping.
Figure 7:
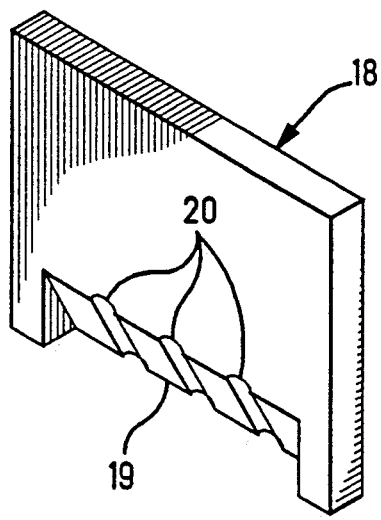
FIG. 7 is a perspective view of a blade of the apparatus of the invention.
Figure 8:
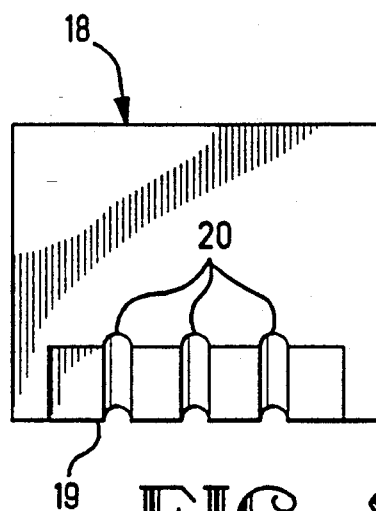
FIG. 8 is a front, elevational view of the blade of FIG. 7.

Turning now to the present invention and referring to FIG. 1, the invention apparatus 11 is shown relative to the cable 12 having an outer jacket 13 and an inner core 14. The apparatus 11 includes upper and lower stripping members 23, 30 having upper and lower blade members 15 which are comprised of pairs of thin guide and gripping members 16 positioned adjacent and on each side of blade sections 18. The blade sections 18, shown in more detail in FIGS. 7 and 8, are formed of an appropriate hardened steel plate to include in the lower portion thereof a bevel defining a set of grooves 20 ending in a sharp edge 19. As can be seen in FIG. 1, a pair of blade sections 18 is utilized for each blade member with the blade sections of a pair placed back to back so that their edges 19 are adjacent to form a wedge shape leading to the edges 19.

Figure 9:
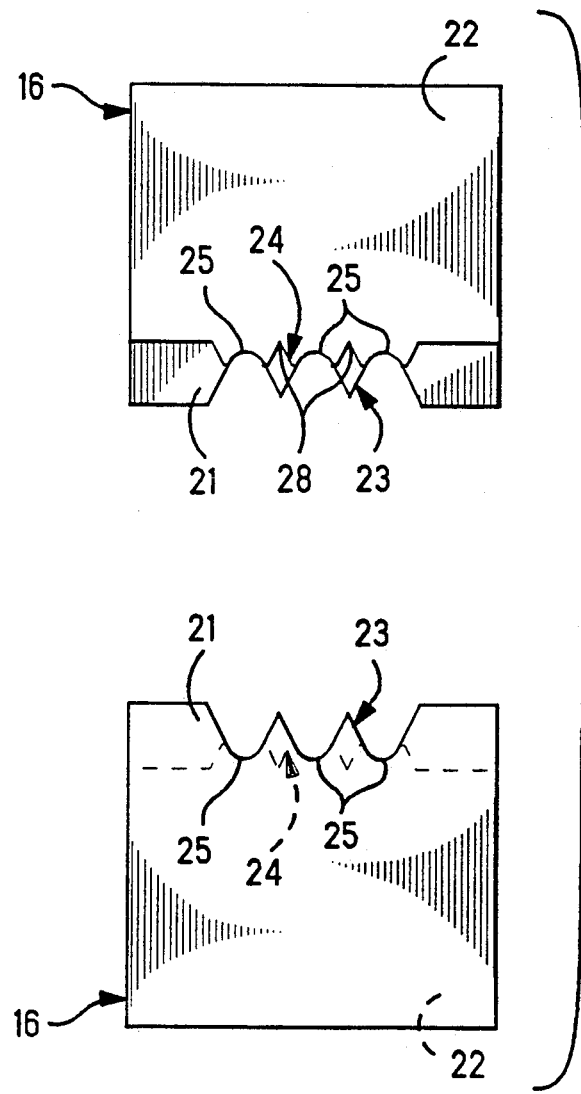
FIG. 9 is a front, elevational view of the guide and gripping members of the invention in an open position.
Figure 10:
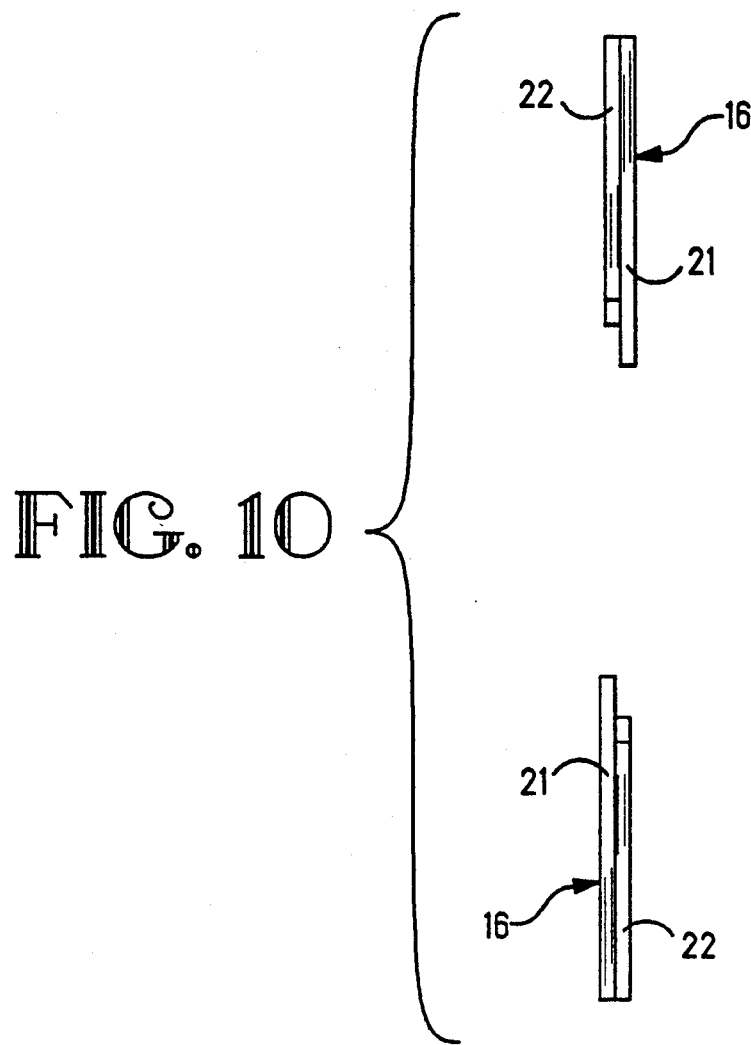
FIG. 10 is a side view of the guide and gripping members shown in FIG. 9.
Figure 11:
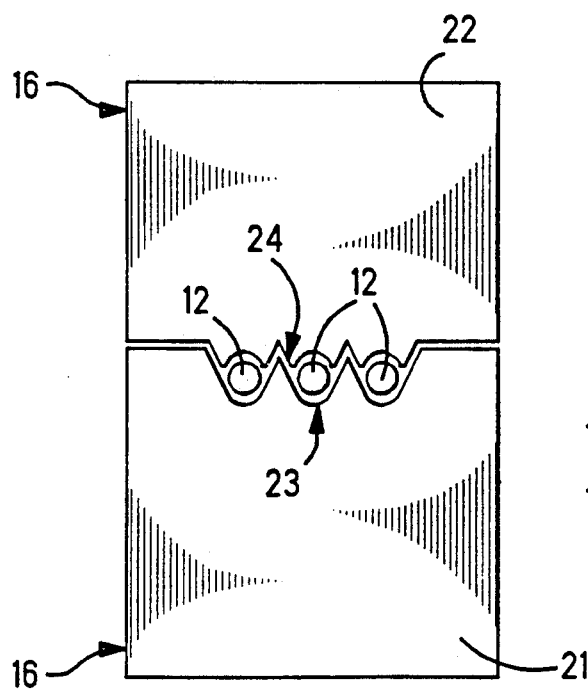
FIG. 11 is a front, elevational view of the guide and gripping members shown in FIG. 9 in a closed position.

The blade sections 18 are confined and supported by guide and gripping members 16 positioned on each side of the blade sections in the manner shown in FIG. 1. FIGS. 9-11 show the guide and gripping members 16 in more detail which are comprised of inner and outer plates 21 and 22 which are fitted together. The guide plates 21 and 22 are provided with aligned teeth 23 and 24, as shown in FIG. 9, that end in rounded or arc shaped recesses 25 which are of a configuration to fit around and grip the cable jacket 13 when the plates are closed together in the manner shown in FIG. 11. Also shown in FIG. 1 is a suction element 17 including a passage 27 therethrough which has a beveled entrance 26. Suction element 17 is connected to a tube and vacuum source, not shown. Also not shown, but understood to be present in the invention and in the description to follow, are drive means operating to hold and position the blade members 15, guide and gripping members 16, as well as the cable 12 and the suction device 17 and also cause relative radial and axial movements of these elements in the manner to be described as follows.

Figure 2:
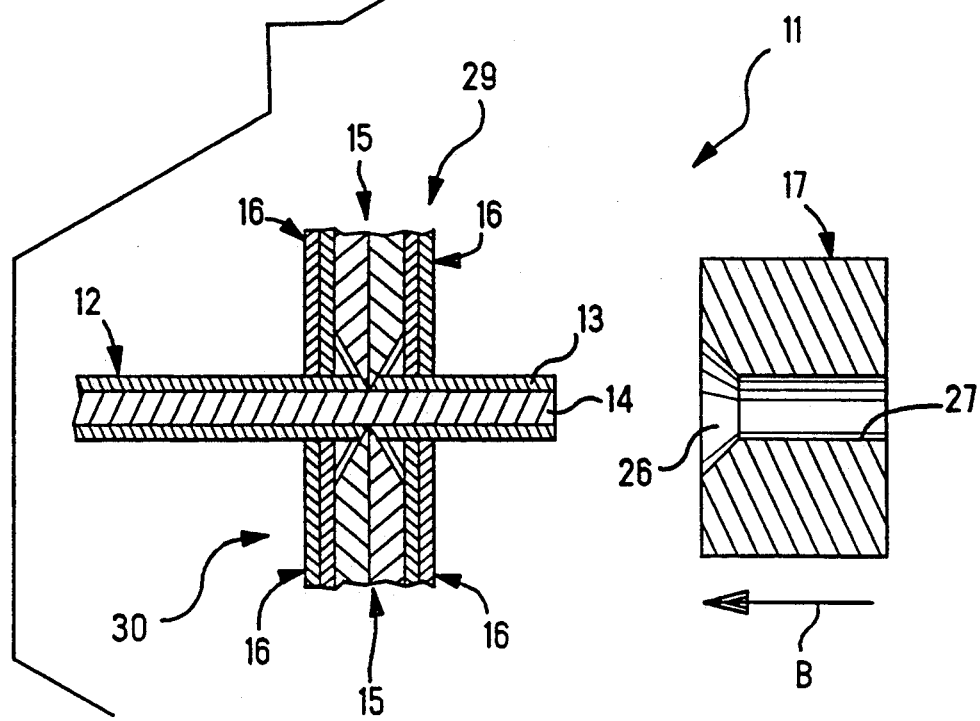
FIG. 2 is a view of the apparatus of FIG. 1, closed onto the cable.

Referring now to FIGS. 1 and 2, and noting the arrows A shown in FIG. 1, the blade members 15 are driven radially inwardly to close upon the wire 12 with the guide and gripping members 16 gripping the wire jacket 13 on each side of the blade sections 18, and the blade sections 18 penetrating via the sharp edges 19 the jackets 13. As can be appreciated from a view of FIGS. 7, 8, and 11, the blade sections and the guide and gripping members are held together in a manner so that the blade members 15 lower most extremity 19 of the flat portions of blade sections 18 come into engagement when the cable stripping apparatus is in the position shown in FIG. 2. The guide and gripping members 16, as shown in FIG. 11, do not close completely through the internesting of the teeth 23 and 24 at tooth recesses 28 and the gripping of the recesses 25 on the jacket.

Figure 3:
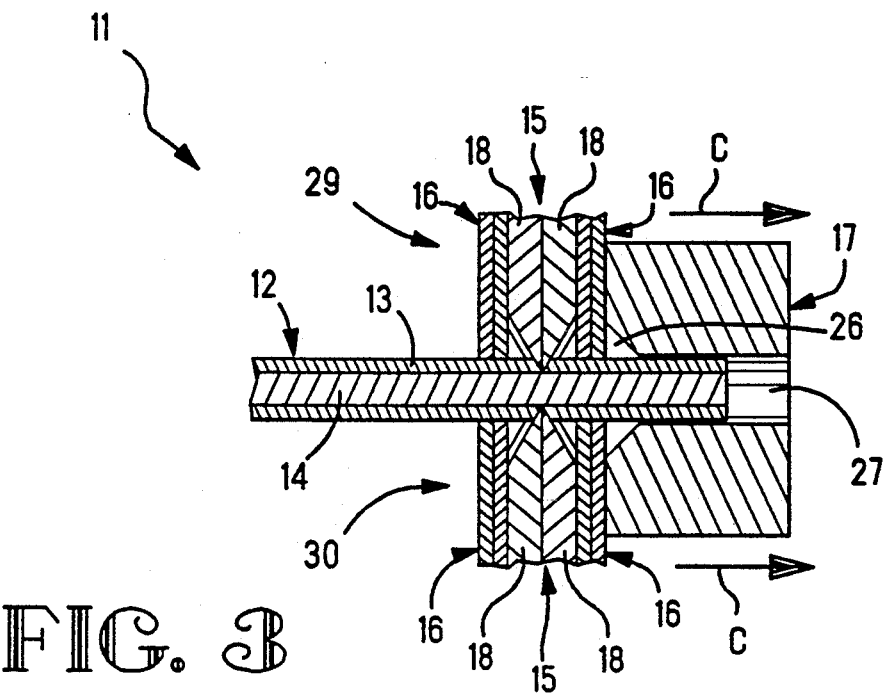
FIG. 3 is a view of the apparatus of FIGS. 1 and 2 with a jacket suction device in position proximate the stripping blades.

Following the closure shown in FIG. 2, an axial movement, in accordance with the arrow B of the suction device 17 relative to the members 15 takes place so that the suction device and the blade members come together with the end of the cable extending into the passage 27 of device 17. The right hand blade sections 18, members 16 and suction device 17 then move in the direction of arrows C as shown in FIG. 3 relative to left hand blade sections 18 and members 16 thereby stripping an end of jacket 13 from cable jacket 13 thereby exposing core 14, as shown in FIG. 4.

Figure 4:
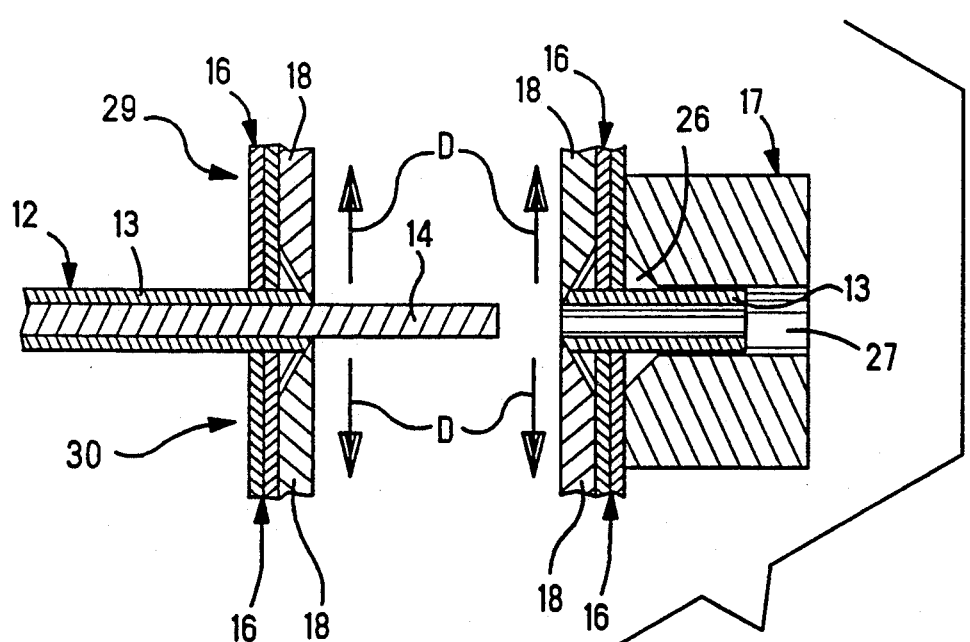
FIG. 4 is a view of the apparatus shown in FIG. 3 following axial displacement of the stripping blades to remove a stripped section of jacket.
Figure 5:
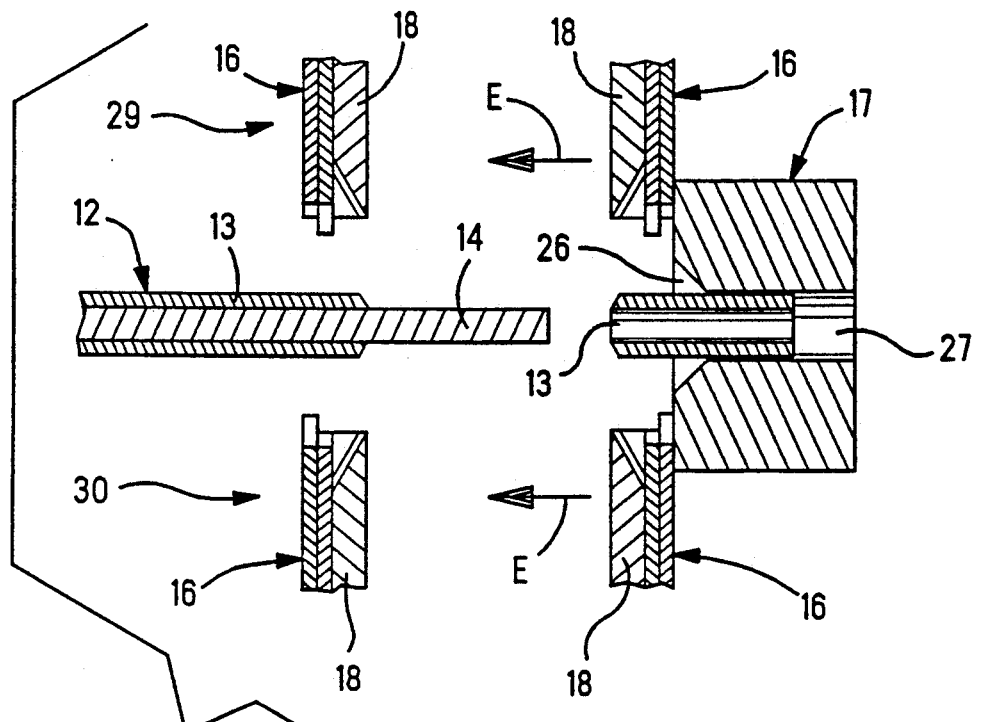
FIG. 5 is a view of the apparatus of FIG. 4 with the apparatus radially opened.

In FIG. 4, the left-hand assembly of blade sections 18 and members 16 remain in engagement with the jacket 13 of the cable 12, whereafter, the upper and lower blade members 18 and members 16 of the right-hand and left-hand assemblies move away from each other according to arrows D as shown in FIG. 4. FIG. 5 shows the next step with the various elements of the pairs of blade sections 18 and members 16 displaced away from the axis of the cable 12; and, in accordance with arrow E, the right-hand assembly moves to engage the left-hand assembly, as shown in FIG. 6.

In accordance with the invention, the device 17 is, as mentioned, attached to a suction source and an appropriate tube to draw the cut section of jacket 13 from passage 27 away from the stripping apparatus. In high volume stripping operations, the scrap formed by the cut ends of jackets from the cables can become a problem in causing jams of the apparatus or of the cutting blades themselves. To this end, an immediate and timely removal of the jacket sections removed from the cable is important.

Figure 6:
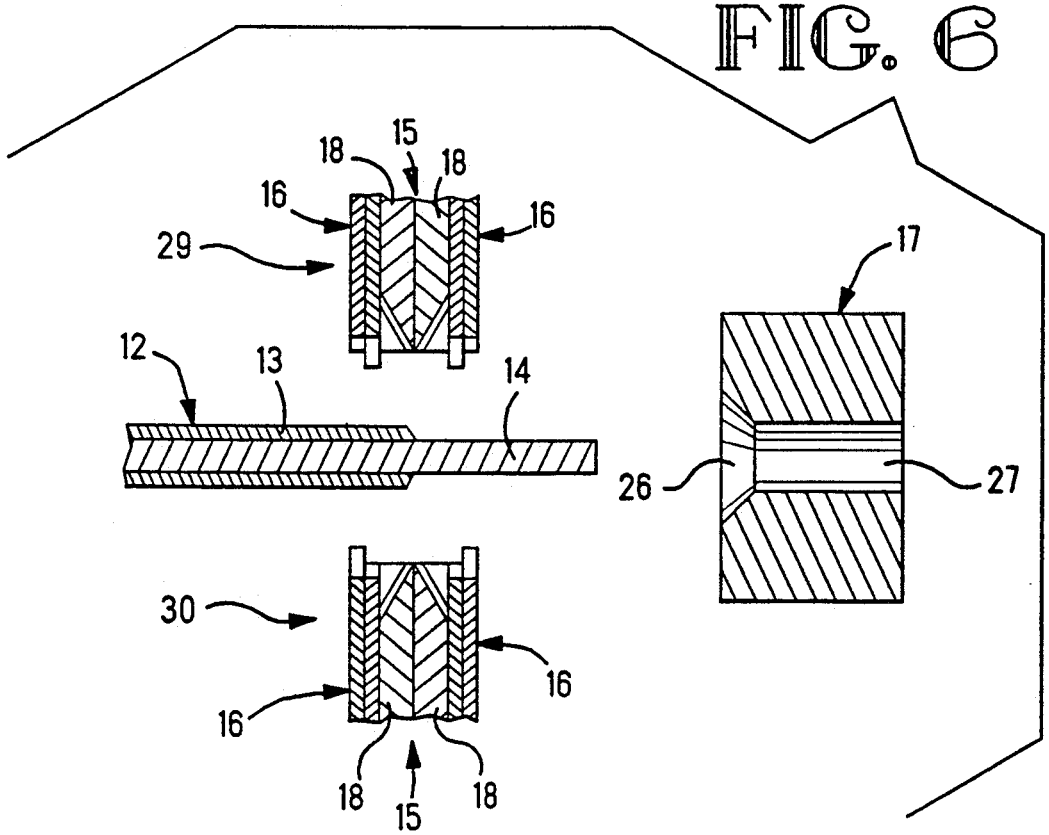
FIG. 6 is a view of the apparatus of FIG. 5 with the cut section of jacket removed and the blades restored to an initial position.

FIG. 6 shows the blades 15 restored into an initial position with the blade sections 18 drawn axially together, along with the guide and gripping members 16, and in the opened position, as shown initially in FIG. 1. The stripped cable shown in FIG. 6 is removed, and the next cable to be stripped positioned as shown in FIG. 1 for a repeat of the cycle.

To be appreciated is the fact that the left-handed blade sections 18, along with the adjacent guide and gripping members 16, are in engagement with the cable as the right-handed blade sections 18 and guide and gripping members 16 are pulled axially away from the cable to effectively strip the jacket section from the core. The inner surface of blade sections 18 acts as a dam to resist stresses caused by tensional forces as the cable jacket section is separated from the cable proper. At this time, the guide and gripping members 16 support the cable and resist the tendency of the blade sections 18 from being displaced axially to allow tensional forces to be expressed within either the jacket 13 or the core 14 of the cable. This holding action reduces the clamping forces necessary to hold the cable during the stripping operation and eliminates damage to the cable jacket and core caused by such forces.

Having now disclosed the invention in terms enabling a preferred practice thereof, claims are appended intended to define the invention.

1. An apparatus for stripping the insulation from a conductor including cooperating upper and lower stripping members, said apparatus comprising:

an upper stripping member including an upper blade member and a pair of upper guide and gripping members, said upper blade member includes a pair of blades for cutting the conductor insulation;
(a) each of said upper guide and gripping members includes a first plate and a second plate, the first plate includes a plurality of pointed teeth, and the second plate includes a plurality of pointed teeth, the first plate pointed teeth being laterally offset from the second plate pointed teeth;
(b) each of the first and second plates further include arcuate portions adjacent said teeth;
(c) a lower stripping member including a lower blade member and a pair of lower guide and gripping members, said lower blade member includes a pair of lower blades for cutting the conductor insulation; and
(d) wherein the second plate includes a pair of tooth recesses formed in the shape of said first plate pointed teeth,
whereby said upper and lower stripping members cooperate to strip the conductor insulation.

2. The cable stripping apparatus of claim 1, wherein the upper and lower blade members include semi-circular cutting edges.

3. The cable stripping apparatus of claim 1, wherein the apparatus includes a suction device for removing the cable jacket.

4. An apparatus for stripping the insulation from a conductor including cooperating upper and lower stripping members, said apparatus comprising:
(a) an upper stripping member including an upper blade member and a pair of upper guide and gripping members, said upper blade member includes a pair of blades for cutting the conductor insulation;
(b) each of said upper guide and gripping members includes a first plate and a second plate, the first plate includes a plurality of pointed teeth, and the second plate includes a plurality of pointed teeth, the first plate pointed teeth being laterally offset from the second plate pointed teeth;
(c) a lower stripping member including a lower blade member and a pair of lower guide and gripping members, said lower blade member includes a pair of lower blades for cutting the conductor insulation;
whereby said upper and lower stripping members cooperate to strip the conductor insulation.

5. The cable stripping apparatus of claim 4, wherein each of the first and second plates further include arcuate portions adjacent said teeth.

6. The cable stripping apparatus according to claim 4, wherein the second plate includes a pair of recesses formed in the shape of said first plate pointed teeth.

7. The cable stripping apparatus of claim 4, wherein the upper and lower blade members include semi-circular cutting edges.

8. The cable stripping apparatus of claim 4, wherein the apparatus includes a suction device for removing the cable jacket.

* * * * *